United States Patent [19]

Bertschy et al.

[11] Patent Number: 4,589,036
[45] Date of Patent: May 13, 1986

[54] APPARATUS AND METHOD FOR INSTRUMENTED RADIAL TRANSLATION OF A READ/WRITE TRANSDUCER AT START-UP OF A ROTATING DISK FILE

[75] Inventors: John R. Bertschy; T. Jay Cameron; Kenneth L. Deckert; Sylvia L. Lee, all of San Jose, Calif.

[73] Assignee: International Business Machines Corporation, Armonk, N.Y.

[21] Appl. No.: 677,761

[22] Filed: Dec. 3, 1984

[51] Int. Cl.⁴ .............................................. G11B 5/54
[52] U.S. Cl. ..................................................... 360/75
[58] Field of Search ............................. 360/69, 71, 75

[56] References Cited

U.S. PATENT DOCUMENTS

| 4,530,021 | 7/1985 | Cameron | 360/97 |
| 4,542,429 | 9/1985 | Nishida et al. | 360/75 X |

FOREIGN PATENT DOCUMENTS

| 54-23511 | 2/1979 | Japan | 360/71 |
| 57-103161 | 6/1982 | Japan | 360/75 |
| 57-127968 | 8/1982 | Japan | . |
| 58-1858 | 1/1983 | Japan | 360/69 |

OTHER PUBLICATIONS

IBM Technical Disclosure Bulletin, vol. 21, No. 11, Apr. 1979, p. 4647, Landing of Magnetic Heads on Disks, J. C. Uy.
IBM Technical Disclosure Bulletin, vol. 25, No. 9, Feb. 1983, pp. 4903–4905, Reducing the Viscous Force (Stiction) of Magnetic Head Sliders on Lubricated Magnetic Disks, H. Hinkel et al.
IBM Technical Disclosure Bulletin, vol. 21, No. 12, May 1979, p. 4992, "Start/Stop Life Enhancement by Actuator Preload", by M. K. Hill, R. L. Martin, W. H. McConnell and K. J. Stahl.

Primary Examiner—George G. Stellar
Attorney, Agent, or Firm—Thomas R. Berthold

[57] ABSTRACT

The start-up of a rotating disk file is controlled by first moving the sliders (30, 32, 40, 42) supporting the read/write heads radially outwardly from the inside diameter (20) of the disks (10, 12, 14) by applying a voltage from voltage source (70) to voice coil motors (34, 44), sensing the position of the sliders (30, 32, 40, 42) on the disk surfaces with a position sensor (80), initiating rotation of the disk drive motor (18) when the sliders (30, 32, 40, 42) have moved a dewetting distance, and terminating radial translation of the sliders (30, 32, 40, 42) when the disk drive motor (18) has reached operating speed and the sliders (30, 32, 40, 42) are riding on a bearing of air above the disk surfaces. The instrumented radial translation of the sliders (30, 32, 40, 42) overcomes the stiction forces at the slider-disk interface without damage to the read/write heads, the disks (10, 12, 14) or the slider suspensions (36, 38, 46, 48).

13 Claims, 1 Drawing Figure

APPARATUS AND METHOD FOR INSTRUMENTED RADIAL TRANSLATION OF A READ/WRITE TRANSDUCER AT START-UP OF A ROTATING DISK FILE

BACKGROUND OF THE INVENTION

This invention relates to rotating disk files of the type in which the read/write transducer is in contact with the disk surface when the disk is at rest and "flies" above the disk surface when the disk is rotating at its operating speed, and in particular to an apparatus and method for starting the rotation of the disk to prevent damage to the disk and/or transducer caused by the transducer sticking to the disk surface.

In many types of rotating disk files, the read/write transducers or heads are supported on a slider which rides on a cushion or bearing of air above the disk surface when the disk is rotating at its operating speed. The slider is connected to a linear or rotary voice coil actuator by means of a relatively fragile suspension. In large capacity magnetic recording disk files there is generally a stack of rigid disks and a number of actuators with each actuator supporting a number of sliders. The actuators move the sliders radially between the disks so that each head may access the recording area of a respective disk.

In these conventional disk files the slider is biased against the disk surface by a small force from the suspension when the disk is not rotating. The slider is thus in contact with the disk surface from the time the disk file is turned on until the disk reaches a speed sufficient to cause the slider to ride on the air bearing. The slider is again in contact with the disk surface when the disk file is turned off and the rotational speed of the disk falls below that necessary to create the air bearing. In such disk files a lubricant is often maintained on the disk surface to prevent damage to the head and the disk during starting and stopping of the disk. A serious problem with such disk files is that after the slider has been in stationary contact with the disk surface for just a short period of time, the slider tends to resist translational movement or "stick" to the disk surface. This "stiction" is caused by a variety of factors, including static friction and viscous shear forces and surface tension created by the lubricant between the disk and the slider. Even in those disk files which have disks with extremely smooth unlubricated disk surfaces, stiction may occur because of the strong intermolecular attraction at the interface between the smooth disk and slider surfaces. This stiction can result in damage to the head or disk when the slider suddenly breaks free from the disk surface when disk rotation is initiated. In addition, because the suspension between the actuator and the slider is relatively fragile in order to permit the slider to fly above the disk surface, sudden rotation of the disk can also damage the suspension.

In one known technique to overcome the stiction problem, disk rotation is started very slowly so that the slider breaks free from the disk surface gradually. This approach has the disadvantages that it requires a relatively long period of time to bring the disk file up to operating speed and that it imparts tangential forces to the suspensions, which is the direction where they are structurally weakest.

SUMMARY OF THE INVENTION

The invention solves the stiction problem by providing an apparatus and method for starting a disk file by first moving the slider supporting the head radially, sensing the radial position of the slider, initiating rotation of the disk when the slider has moved a distance sufficient to break loose from the area in which it was stuck, and then continuing to move the slider radially until the disk has reached its operating speed and the slider is flying above the disk surface. When the present invention is utilized on a disk file having multiple disks and actuators, means are also provided for oscillating the sliders on one or more of the actuators radially in and out over a relatively short distance if all the actuators do not release at approximately the same time. This assures that all of the sliders are maintained in motion over the disk surfaces until the disks have reached operating speed, at which time all of the sliders will be riding on an air bearing.

For a fuller understanding of the nature and advantages of the present invention, reference should be made to the following detailed description taken in conjunction with the accompanying drawing.

DESCRIPTION OF THE PREFERRED EMBODIMENT

Figure 1:
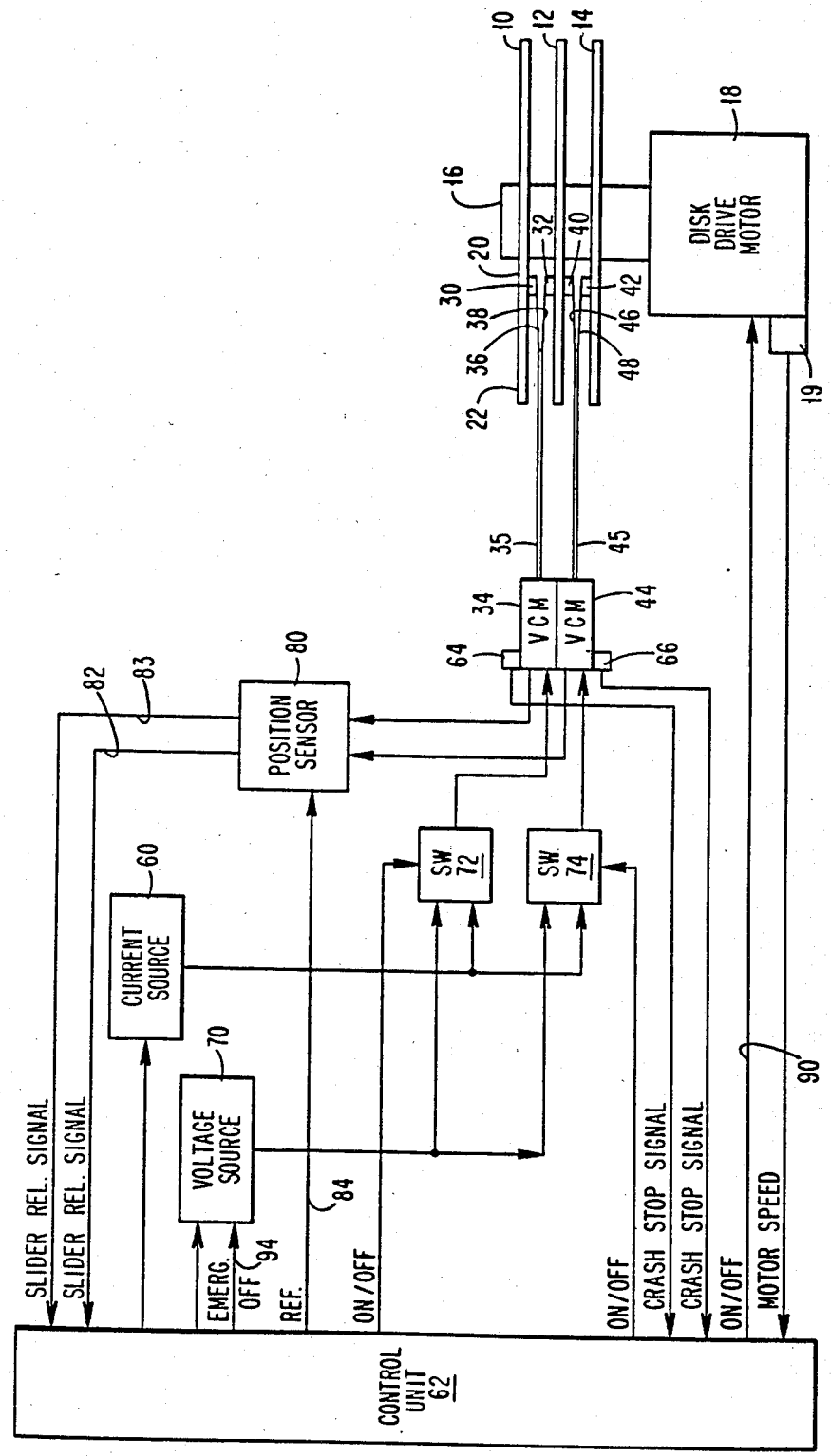
FIG. 1 is a simplified block diagram of a disk file illustrating the means for implementing instrumented radial translation during start up.

In a conventional disk file as illustrated in FIG. 1, a plurality of rigid rotatable disks, such as representative disks 10, 12, and 14, are supported on a spindle 16 and rotated by a disk drive motor 18, whose rotational speed is sensed by sensor 19. The magnetic recording media on each disk is in the form of an annular pattern of concentric data tracks having an inside diameter 20 and an outside diameter 22, as shown on disk 10.

As the disks rotate, the sliders are moved radially in and out so that the heads may access different portions of the disk surfaces containing the data. Each slider supports one or more read/write heads and is attached to an actuator arm by means of a suspension, as illustrated by suspensions 36, 38 connecting sliders 30, 32 to actuator arm 35. The suspensions provide a slight spring force which biases the sliders against the disk surfaces. Each actuator arm is attached to a voice coil motor (VCM) or actuator, such as arm 35 connected to VCM 34. Each VCM is a coil movable within a fixed magnetic field, the direction and velocity of the coil movement being controlled by the current supplied. The construction and operation of sliders 40, 42, suspensions 46, 48, actuator arm 45, and VCM 44 is identical to that described for sliders 30, 32 suspensions 36, 38, actuator arm 35, and VCM 34.

During operation of the disk file, the rotation of the disks generates an air bearing between the sliders and the disk surfaces. This air bearing thus counterbalances the slight spring force of the suspensions and supports the sliders off the disk surfaces during operation.

The above description of a conventional disk file, and the accompanying illustration of it in FIG. 1, are for representative purposes only. It should be apparent that disk files may contain a large number of disks and VCMs and that each VCM may support a number of sliders. The present invention of instrumented radial translation at start-up of a disk file is fully applicable to any such disk file, provided it is of the type in which the sliders are in contact on the disk surfaces when the disks are at rest and "fly" above the disk surfaces when the disks are rotating at operating speed.

VCMs 34, 44 are controlled in the disk file by means of a current source 60 and a control unit 62 which includes logic circuitry and an internal timer. The radial positions of the sliders 30, 32 and 40, 42 are provided to control unit 62 by servo signals from either a dedicated servo disk (not shown) or servo sectors on the data disks. During a "seek" operation to move the sliders from one recording track to another, the control unit 62 provides the desired current profile to current source 60 in response to the servo signals. Current source 60 in turn generates a current of the proper magnitude and duration to optimally move the sliders to the desired track. Similarly, during track following control unit 62 provides signals to current source 60 in response to the servo signals to maintain the heads over the track centerlines. The control unit 62 also receives a signal if either of the VCMs have moved the sliders to the outside diameter 22 of the disks. This is provided by crash stop sensors 64, 66 on VCMs 34, 44, respectively.

In the present invention the VCMs 34, 44 are controlled to provide the instrumented radial translation of the sliders prior to start of disk drive motor 18 by means of a separate voltage source 70 which supplies a voltage through switches 72, 74. It should be noted, however, that this is but the preferred embodiment of the present invention, it being fully within the scope of the present invention to provide the necessary control of the VCMs for instrumented radial translation through the same current source 60 as is used to provide track seeking and track following. The switches 72, 74, which are controlled by control unit 62, switch in voltage source 70 during instrumented radial translation at start-up and current source 60 during normal operation for track seeking or track following after the disks 10, 12, and 14 have reached operating speed.

It is necessary to provide slider position information to control unit 62 in order to assure that all of the sliders have moved the proper "dewetting" distance. On lubricated disks the dewetting distance is the distance necessary to break loose from the lubricant in the slider-disk interface. This position information is provided by position sensor 80 which monitors the back electromotive force (BEMF) from VCMs 34, 44 and sends slider release signals on lines 82, 83, respectively, to control unit 62. The BEMF of a VCM is that voltage generated by movement of the coil through the fixed magnetic field, regardless of whether the coil is moved manually or by means of a voltage applied to the coil from voltage source 70. The BEMF in volts is the rate of change of flux through the coil in the VCM, which is directly proportional to the velocity of the coil. Thus position sensor 80 includes a voltage sensor which monitors the radial position of the sliders by measuring the BEMF, which is proportional to slider velocity. The integration of this velocity over time produces a distance or position value.

The invention can be better understood by considering the function of the above-described components during start-up of the disk file. Prior to start-up, the sliders 30, 32 and 40, 42 are in contact on their respective surfaces of disks 10, 12, 14 at the inside diameter 20, the sliders having been so positioned when the disk file was powered down in the previous cycle. When the disk file is turned on, the control unit 62 signals switches 72, 74 to the proper position for connecting voltage source 70 to VCMs 34, 44. Control unit 62 next signals voltage source 70 to provide a voltage profile to each of the VCMs 34, 44, which in the preferred embodiment is a fixed voltage of sufficient amplitude to cause the sliders to move radially outwardly at a constant velocity. However, because of stiction between the sliders and their respective disk surfaces, the sliders do not necessarily release immediately upon application of the voltage to the VCMs. The sliders may release at different times because of different stiction forces. Thus actuator arms 35, 45 may begin radial translation at different times.

As soon as either of the coils in VCMs 34, 44 begins to move a BEMF will be induced. The BEMF from each of the VCMs 34, 35 is input to position sensor 80 and compared to a reference voltage from control unit 62 via line 84. As soon as the BEMF from either VCM 34 or VCM 44 exceeds the predetermined reference voltage from line 84, a release signal will be output to control unit 62 on lines 82 or 83 respectively, thus indicating that actuator arm 35 or actuator arm 45 has released and is in radial translation. Once the BEMF from a VCM exceeds the reference voltage, the coil, and thus the sliders attached to the actuator arm, is moving generally at a constant velocity because of the fixed voltage of sufficient amplitude from voltage source 70. The control unit 62 then measures the time from the receipt of the slider release signal to determine that the slider has moved the predetermined dewetting distance. In the case of lubricated disks, this dewetting distance is the distance that the slider must move to break away from the forces created by the lubricant between the slider and the disk surface. This distance can be determined experimentally for various types of disks and sliders but is within the range of approximately one to three radial contact lengths between the slider and the disk surface.

When control unit 62 has received signals from position sensor 80 that both of the actuator arms 35, 45 are in radial translation, a signal is sent on output line 90 to disk drive motor 18 to begin rotation of disks 10, 12 and 14. As the disks commence rotation the sliders continue radial translation outwardly until the disks have reached at least the speed at which the sliders are flying over the disk surfaces. In the preferred embodiment, however, radial translation of the sliders is not terminated until the disks have reached operating speed. In the embodiment shown in FIG. 1, control unit 62 receives disk drive motor speed information from sensor 19. Alternatively, it is possible for control unit 62 to determine the speed of disk drive motor 18 by measuring the time from instant of turn-on.

If one or both of actuator arms 35, 45 has reached its respective crash stop 64, 66 before the disks have reached operating speed, control unit 62 signals the appropriate switches 72, 74 to switch out voltage source 70 and switch in current source 60 to the appropriate VCMs 34, 44. Control unit 62 then provides an appropriate current profile to current source 60 to drive the VCMs so as to oscillate the sliders attached to those actuator arms which have "prematurely" reached their crash stops. This oscillation occurs over a relatively short radial distance near the outside diameter 22 and keeps the sliders in radial motion relative to the disk surfaces until the sliders are flying above the disk surfaces. In the preferred embodiment, this oscillation continues until the disks reach operating speed, which assures that the sliders are flying above the disk surfaces. If the disks have reached operating speed before actuator arms 35, 45 reach their crash stops, then control unit 62, which has received disk drive motor rotational speed information from sensor 19, provides an output signal to switches 72, 74 to switch out voltage source 70 and switch in current source 60. The disk file is now in its normal mode of operation and is ready for track seeking.

If either of actuator arms 35, 45 has not moved radially after a predetermined time interval from application of the fixed voltage from voltage source 70, then control unit 62 provides an emergency off signal on line 94 to voltage source 70 to immediately return the actuators which have moved to the inside diameter 20 and terminate application of voltage to the VCMs, thereby preventing any damage to the disk file.

The sensing of the radial position of the sliders on the disk surfaces during the start-up procedure is an important feature of the present invention and is necessary in order to assure that the disks do not commence rotation before the stiction forces have been overcome. Otherwise suspensions 36, 38 and 46, 48 could be subjected to excessive tangential forces resulting in either structural damage to the suspensions or sudden "rebound" of the sliders, which can damage the heads and disk surfaces. The sensing of the position of the sliders by measuring velocity, through BEMF sensing, and time in motion is but one means of sensing the radial position of the sliders. For example, a photo-Darlington device can be used to sense relative displacement between the movable coil and the fixed part of each of the VCMs to indicate the distance the actuator arm has moved.

When the disk file is turned off, the control unit 62 signals current source 60 to drive VCMs 34, 44 so that the sliders are at their radially innermost position when they come to rest on the disk surfaces. This assures that the sliders are in the proper location for radial translation when the disk file is next turned on.

While the preferred embodiments of the present invention have been illustrated in detail, it should be apparent that modifications and adaptations of those embodiments will occur to those skilled in the art without departing from the sphere and scope of the present invention as set forth in the following claims.

What is claimed is:

1. A method of controlling the rotation of a disk in a disk file of the type having a rotatable data storage disk, a head for reading or writing data onto the disk and an actuator attached to the head for moving the head over the surface of the disk, wherein the head is in contact on the disk surface when the disk is at rest and rides on a bearing of air above the disk surface when the disk rotates at its operational speed, the method comprising the steps of:
    moving the head radially;
    sensing the position of the head;
    initiating rotation of the disk when the head has moved a predetermined radial distance; and
    continuing to move the head radially until the disk is rotating at a predetermined speed.

2. The method according to claim 1 wherein the step of continuing to move the head radially further comprises oscillating the head radially in and out.

3. The method according to claim 1 wherein the step of moving the head radially further comprises moving the head radially outwardly.

4. The method according to claim 1 wherein the step of sensing the position of the head further comprises sensing the back electromotive force of the actuator.

5. The method according to claim 1 wherein the step of moving the head radially further comprises the steps of applying a predetermined voltage to the actuator, measuring the time that voltage is applied and removing the applied voltage in response to the sensed position of the head if the head has not moved within a predetermined time period.

6. The method according to claim 1 for terminating rotation of the disk, the method further comprising the steps of decreasing the rotation of the disk and positioning the head to a predetermined location on the disk surface before the speed of rotation of the disk has dropped below the speed at which the head rides on a bearing of air above the disk surface.

7. The method according to claim 6 wherein the step of positioning the head to a predetermined location includes the step of moving the head to the radially innermost location on the disk surface.

8. The method according to claim 1 wherein the disk file has multiple actuators, each actuator being connected to at least one head, wherein the step of initiating rotation of the disk further comprises initiating rotation of the disk when the heads attached to all of the actuators have moved a predetermined radial distance.

9. A method of starting the rotation of a disk in a disk file of the type having at least two rotatable data recording disks attached to a drive motor and at least two voice coil actuators, each actuator supporting at least one read or write transducer, wherein the transducers are in contact on their respective disk surfaces when the disks are stopped and ride on a bearing of air above the disk surfaces when the disks rotate at their operating speed, the method comprising the steps of:
    supplying a voltage to the voice coil actuators to move the transducers radially outwardly;
    sensing the position of each of the transducers;
    comparing the sensed positions with predetermined values;
    initiating rotation of the disk drive motor to cause the disks to rotate when the sensed position of each transducer exceeds the predetermined value;
    terminating the voltage supplied to each of the actuators when each of the actuators has reached its radially outermost position; and
    thereafter energizing each of the actuators when each actuator has reached its radially outermost position to cause the attached transducers to oscillate radially in and out until the disks are rotating at their operating speed.

10. In a disk file of the type having at least one rotatable data storage disk, a disk drive motor, at least one radially movable actuator and at least one read or write head attached to the actuator, wherein the head is in contact on the surface of the disk when the disk is at rest and rides on a bearing of air above the surface of the disk when the disk is. rotating at its operating speed, an improvement to the disk file for preventing the head from sticking to the surface of the disk during rotational start-up comprising:
    means for energizing the actuator to cause the head to move radially when the disk is at rest;
    means for sensing the radial position of the head;
    means for comparing the sensed radial position of the head to a predetermined value and for generating a signal when the sensed position equals that value;

means responsive to the signal from the comparing means and electrically coupled to the disk drive motor for applying a current to the disk drive motor to cause rotation of the disk; and means for determining the rotational speed of the disk and for signalling the actuator energizing means to cause the head to stop radial movement when the disk has attained its operating speed.

11. The improvement according to claim 10 wherein the position sensing means further comprises means electrically coupled to the actuator for sensing the back electromotive force generated by the actuator.

12. In a disk file of the type having multiple rotatable data storage disks, a disk drive motor for rotating the disks, multiple movable voice coil actuators and at least one read or write head attached to each actuator for reading or writing data onto a respective disk, wherein the heads are in contact on the surface of the disk when the disks are at rest and ride on bearings of air above the surface of the disk when the disks are rotating at their operating speed, an improvement to the disk file for starting and stopping the rotation of the disks to prevent the heads from sticking to the surface of the disks comprising:

means for energizing the actuators to cause the heads to move radially outwardly when the disks are at rest;

means coupled to each of the actuators for sensing the back electromotive force generated by each of the actuators in response to radial movement of the actuators when the disks are at rest;

means for comparing the back electromotive force generated by each of the actuators with a predetermined value and for generating a signal when the electromotive force for each of the actuators exceeds that value;

means responsive to the signals from the back electromotive force comparing means for determining the radial distance each of the actuators has moved and for comparing that distance to a predetermined dewetting distance;

means for determining the rotational speed of the disks; and means responsive to the disk speed determining means and to the radial distance comparing means for causing the heads to stop radial movement when the disks have attained their operating speed and for causing the heads to move to their radially innermost position when rotation of the disks is stopped.

13. The improvement according to claim 12 wherein the actuator energizing means includes means for causing the heads to oscillate radially in and out over a relatively short distance when the heads are at their radially outermost position and before the disks have reached their operating speed.

* * * * *